(No Model.) 8 Sheets—Sheet 7.

J. T. MEATS & T. W. DEAN.
SPINNING MULE.

No. 573,280. Patented Dec. 15, 1896.

Witnesses.
Louis N. Gowell
Fred L. Greenleaf

Inventors.
John T. Meats
Truman W. Dean
by Crosby & Gregory Attys.

(No Model.) 8 Sheets—Sheet 8.

J. T. MEATS & T. W. DEAN.
SPINNING MULE.

No. 573,280. Patented Dec. 15, 1896.

Witnesses:
Edward F. Allen.
Thomas J. Drummond.

Inventors:
John T. Meats.
Truman W. Dean.
by Crosby Gregory
attys.

UNITED STATES PATENT OFFICE.

JOHN T. MEATS AND TRUMAN W. DEAN, OF TAUNTON, MASSACHUSETTS, ASSIGNORS TO THE MASON MACHINE WORKS, OF SAME PLACE.

SPINNING-MULE.

SPECIFICATION forming part of Letters Patent No. 573,280, dated December 15, 1896.

Application filed May 9, 1892. Serial No. 482,343. (No model.)

*To all whom it may concern:*

Be it known that we, JOHN T. MEATS and TRUMAN W. DEAN, of Taunton, county of Bristol, State of Massachusetts, have invented an Improvement in Spinning-Mules, of which the following description, in connection with the accompanying drawings, is a specification, like letters and figures on the drawings representing like parts.

This invention has for its object the improvement of mules used in the spinning of cotton or other fibrous material, and relates particularly, first, to those parts of the machine which draw the carriage in and out; second, to mechanism for changing the direction of action or movement of the carriage at the end of its drawing and spinning and of its winding movements; third, to the nosing mechanism or means for pointing the cop; fourth, to means for regulating the feed of the quadrant-screw. These and other features of our invention will be hereinafter more particularly described, and pointed out in the claims at the end of this specification.

Heretofore the functions of drawing the carriage in and out have been performed by means of scrolls and ropes or by racks and gearing. The objection to the former plan is that the ropes, owing to their elasticity and consequent tendency to stretch when much strain is put upon them, fail to cause the motion of the carriage to agree at all times with that of the rolls which deliver the yarn to be spun, such variations in motion causing either an undue stretching or a kinking of the yarn, as the case may be.

The chief objection to racks and gearing consists in their lack of adaptability to the uniform acceleration and diminution of speed required in drawing the carriage quickly and certainly toward the beam. To overcome these difficulties and insure positive acceleration and diminution of speed of the carriage, we have devised a mule wherein the motion of the carriage is effected by a scroll and a flexible metallic connection which is wound thereon during the inward run of the carriage, said metallic connection, herein shown as a chain or band, being joined at one end to said scroll and at its other end to a drum. This drum devised by us is operatively connected by suitable gearing, to be described, with and so as to rotate the shaft which imparts movement to the carriage, said shaft being commonly and hereinafter designated as the "back" shaft, the said shaft in turn being joined by flexible metallic connections, preferably sprocket-chains, with the said carriage. By the employment of flexible metallic connections the motion of the carriage is always positive in its relation to other parts of the mule. The mechanism for changing the direction of action, that is, for reversing the motion of the carriage at each end of the draw or stretch, so as to spin and wind alternately, has usually heretofore been arranged in such a manner that it did not permit of easy alteration or of delicate adjustment to the various conditions under which the mule ought to work on different kinds of yarn; and it is to overcome this difficulty that another portion or part of our invention has been devised.

The means devised by us for "nosing" or pointing the cop, or for causing a firm wind at the point thereof, is very simple and completely automatic.

The means devised by us for regulating the quadrant feed is intended to make this part of the machine automatic when once adjusted for any particular size of yarn, and the position of the quadrant-nut on the quadrant is governed automatically by the pressure of the yarn upon the faller-wire.

The following is a description of such parts of the mechanism of the mule and the operation thereof as may be necessary to enable our invention to be understood, reference being made to the accompanying drawings.

Fig. 6, in two views, shows a portion of the nosing mechanism. Fig. 6$^a$ shows the stop-wheel detached; Fig. 8, a detail showing part of the carriage with spindles, faller and counter-faller, and the drawing-rolls. Fig. 9, in two views, shows devices to be described as forming part of the change and locking motion. Fig. 10 is a detail showing what is hereinafter called the "locking-lever," said device being but partially indicated in dotted outline in Fig. 2. Figs. 11 and 12 show separately two other levers to be described, said levers being shown in position, Fig. 9. Fig. 12$^a$ shows the lever $b^{20}$ detached.

Figures 2, 25, 26:
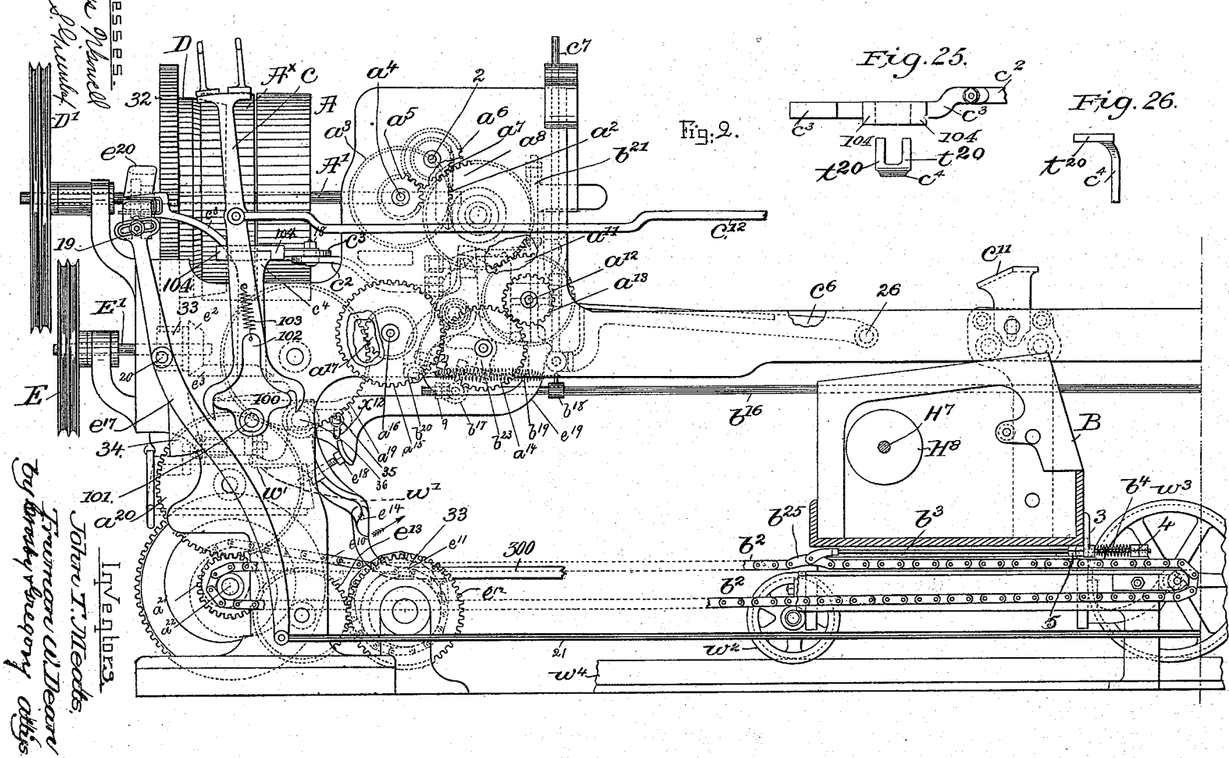
Figs. 2 and 2ª show a left-hand side elevation of the head-stock with the carriage in section, the wheels at one end of the carriage being shown as on the usual track.
Fig. 25 shows part of the arm $c^3$ and the upper end of the lever $c^4$ separated.
Fig. 26 shows the upper end of the lever $c^4$.
Figure 2A:
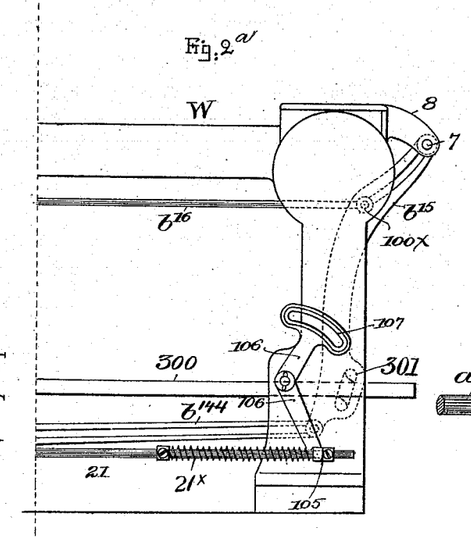

Preparatory to describing with particularity the construction and operation of the parts we will state that the frame or head-stock W, the carriage B, its spindle-driving drum H$^8$, the spindles K$^4$, the faller K$^3$, the counter-faller K$^2$, the drawing-rolls K', the main shaft A', the pulley A, loose thereon, the pulley A$^\times$, fast thereon and one side of which is concaved to receive a conical face of the back-off friction-wheel D, having an attached gear 32, the twist-pulley D', shown as fast on the main driving-shaft, the back shaft $a^{22}$, the quadrant-lever F, the quadrant-screw K$^5$ therein, the nut H thereon, the quadrant-segment F$^{10}$, and its driving-gear F$^9$ are and may be all substantially as common in other well-known forms of mules, the said carriage in practice having suitable wheels $w^2$ $w^3$, two only of which are shown in Fig. 2, to run upon suitable tracks $w^4$ in the backward and forward motion of the carriage, all in usual manner.

We will first refer in our description more particularly to the parts instrumental in moving the carriage in its outward direction.

The main shaft A' receives its motion from a belt extended around the pulley A$^\times$, said belt being driven from a suitable counter-shaft.

The shaft A' has near one end a bevel-gear $a^2$, that engages a bevel-gear $a^3$ on a shaft $a^4$, substantially at right angles to the main shaft. The shaft $a^4$ has a gear $a^5$, (see Fig. 2,) which engages a gear $a^6$, running loosely on a stud 2, said gear $a^6$ having fastened to it what is called a "change-twist" gear $a^7$, the latter engaging a clutch-gear $a^8$, loose on a shaft $a^9$, said shaft being in line with and coöperatively connected to and so as to rotate the front roll $k'$ of the set of drawing-rolls.

The clutch-gear $a^8$ serves as an intermediate gear in the drawing-out and spinning motion and effects the rotation of the drawing-rolls when it is in engagement with the clutch $a^{10}$, feather-keyed on the shaft $a^9$.

The clutch-gear $a^8$ engages a gear $a^{11}$ on a short shaft $a^{12}$, the opposite end of which outside the head-stock has fast upon it a gear $a^{13}$, the latter gear engaging an intermediate gear $a^{14}$, which latter in turn engages a gear $a^{15}$, secured to a shaft $a^{16}$, having loose on it a clutch-gear $a^{17}$, coöperating with which is a sliding carriage-clutch $a^{18}$, feather-splined upon the shaft $a^{16}$.

Figures 1, 16, 17, 18, 19, 20:
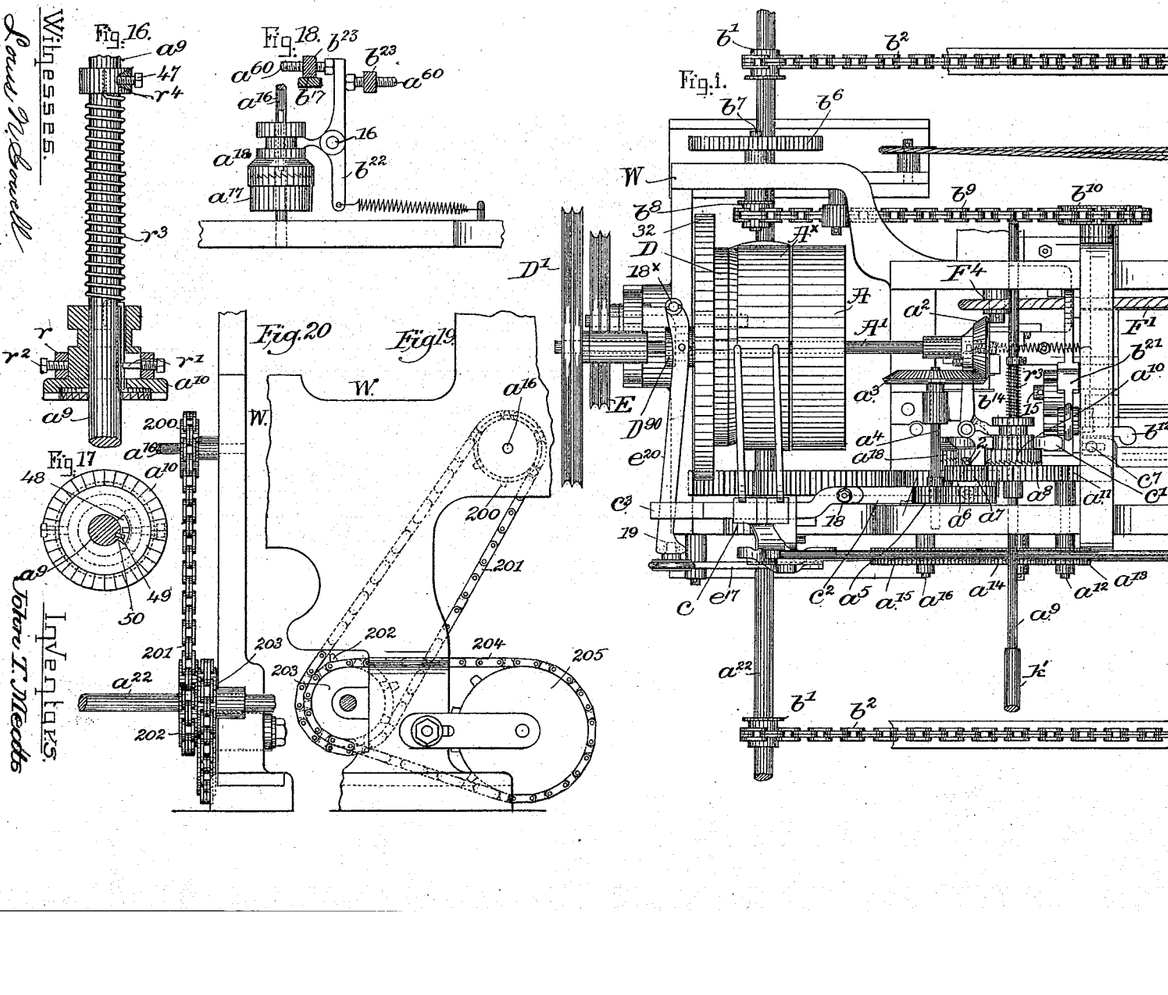
Figures 1 and 1ª together represent in plan view the head-stock and main operating parts of a mule containing our improvements, together with the center part of the carriage, much of the latter being omitted to save space upon the drawings, and in said figures the spindles are omitted.
Figs. 16 and 17 are details showing parts of clutch and coöperating devices whereby the drawing-rolls may be made to start with or a little later than the carriage, the object in the latter case being to take out snarls before the rolls begin to deliver yarn.
Fig. 18 is a detail to be referred to, it showing a clutch for drawing out the carriage.
Figs. 19 and 20 show a modification of our invention to be described.
Figure 1A:
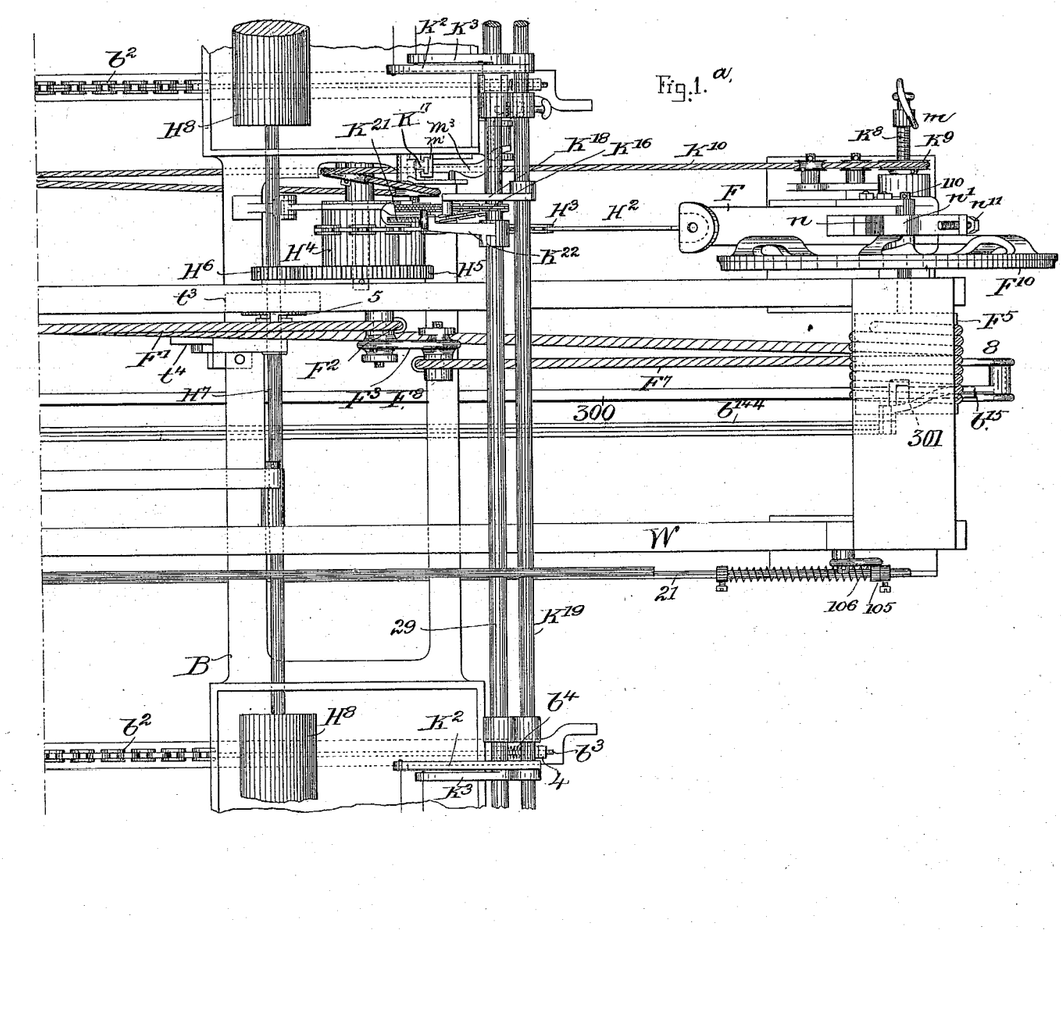

The clutch-gear $a^{17}$ and the clutch $a^{18}$ are shown separately in Fig. 18, and partially in Figs. 1 and 2, by breaking out some of the frame.

The clutch-gear $a^{17}$, through two intermediate gears $a^{19}$ and $a^{20}$, engages and rotates gear $a^{21}$, fast on the back shaft $a^{22}$, the rotation of the latter shaft being effective in giving outward motion to the carriage, as will be described.

The back shaft $a^{22}$ in practice has a number of sprocket-wheels, as $b'$, fast thereon, about which will be extended the metallic flexible connections $b^2$, represented as sprocket-chains, the said connections being united to the carriage, as herein represented, in a yielding manner by or through connecting-rods $b^3$, having coöperating with them spiral or other springs $b^4$. The rods referred to pass through holes in suitable bearing-stands 3, and the said rods lie substantially vertically over the chains, the ends of the rods being represented as pivoted to large links $b^{25}$ of each chain.

The springs $b^4$ referred to enable the carriage to be started easily, as will be obvious, when commencing its inward run, and the springs will bear at such time against the stands 3, nuts 4 on the rods limiting the elasticity of the spring, other nuts, 5, (shown in Fig. 2,) limiting the movement of the rods during the outward run of the carriage.

The outward motion of the carriage B is stopped preparatory to backing off and making the proper changes for running in and winding on by mechanism now to be described, viz: The back shaft $a^{22}$ has fast on it a gear $b^5$, (see Fig. $4^a$,) said gear engaging a gear $b^6$, secured to a shaft $b^7$, having attached to it a suitable chain or sprocket wheel $b^8$, about which is extended a chain $b^9$, the latter going to and about the sprocket or chain wheel $b^{10}$, secured to the shaft $b^{11}$, supported in suitable stands 6, bolted to the floor having the track upon which the carriage runs. The shaft $b^{11}$ has fast upon it, near its other end, a lever $b^{12}$, (see Fig. 7,) on the hub of which is hung loosely a lever $b^{13}$, provided at one side with a projection $b^{13\times}$, the latter lever shown by dotted lines, Fig. $4^a$, and free to move thereon, being connected with a long rod $b^{144}$, (see Figs. $4^a$ and 5,) said rod being extended in the direction of the outward run of the carriage and being connected loosely with a swinging lever $b^{15}$, pivoted at 7 on a stand 8 of the head-stock, (see Figs. $1^a$ and $2^a$,) said lever $b^{15}$ having connected to it between its ends by a stud-screw $100^\times$ a rod $b^{16}$, connected loosely at its opposite end by a swivel-stud $x^{10}$ (see Figs. 9 and 11) with the clutch-lever $b^{17}$, the said rod at its end at a point beyond the swivel-stud having applied to it check-nuts 9, which in the movement of the rod to the right, viewing Fig. 9, as will be hereinafter described, will meet the swivel-stud and turn the clutch-lever $b^{17}$.

The rod $b^{16}$ carries a dog $b^{18}$, to which is connected one end of a spring $b^{19}$, the opposite end of said spring being connected to the lower end of a lever $b^{20}$, (shown in Fig. 9 and separately in Figs. 12 and $12^a$ and partially by dotted lines in Fig. 2,) said lever $b^{20}$ being pivoted on a stud 12, supported in a suitable bracket (not shown) fixed to the head-stock, and having at its inner end at one side a projection 13, which normally rests against the lower end of a curved or inclined flange 14 (see dotted lines, Fig. 9) at the inner side of the oscillating change-lever $b^{21}$, mounted on a stud 15, (see Fig. 5,) the normal strength of the spring $b^{19}$ being sufficient to maintain the lever $b^{20}$ in contact with said flange. In this condition of the parts the end 24 of the locking and adjusting lever $b^{23}$, also pivoted on the stud 12, rests against a shoulder 25 at the inner side of the said change-lever.

The locking and adjusting lever is forked at its lower end, (see Fig. 10,) and the forks are offset or set out of line, and each fork has in its end an adjusting device, as $a^{60}$, said adjusting devices contacting with a lever $b^{22}$, (see Figs. 9 and 18,) said lever being that which engages and at proper times moves the carriage-clutch $a^{18}$ to run the carriage out.

The lever $b^{17}$ in its normal position stands near the lever $b^{22}$. (See Fig. 18.)

Figure 13:
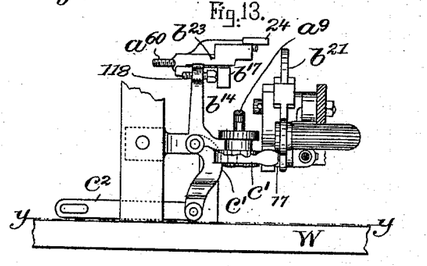
Fig. 13 is a plan view of some of the devices shown in Fig. 9.

The drawing-roll clutch-gear $a^{10}$ is kept in engagement with the drawing-roll clutch-gear $a^8$ by the spring $r^3$, (see Fig. 16,) to be described, and during the outward run of the carriage and spinning, when the rolls are to rotate, the clutch-lever $b^{17}$ stands with its upper end (see Fig. 13) against the adjusting screw or device 118 of the drawing-roll clutch-lever $b^{14}$, and the disengagement of said clutch from said clutch-gear is effected as the carriage completes its outward run by the lever $b^{17}$, acted upon by the rod $b^{16}$, as will be described.

Figures 4, 6, 6A:
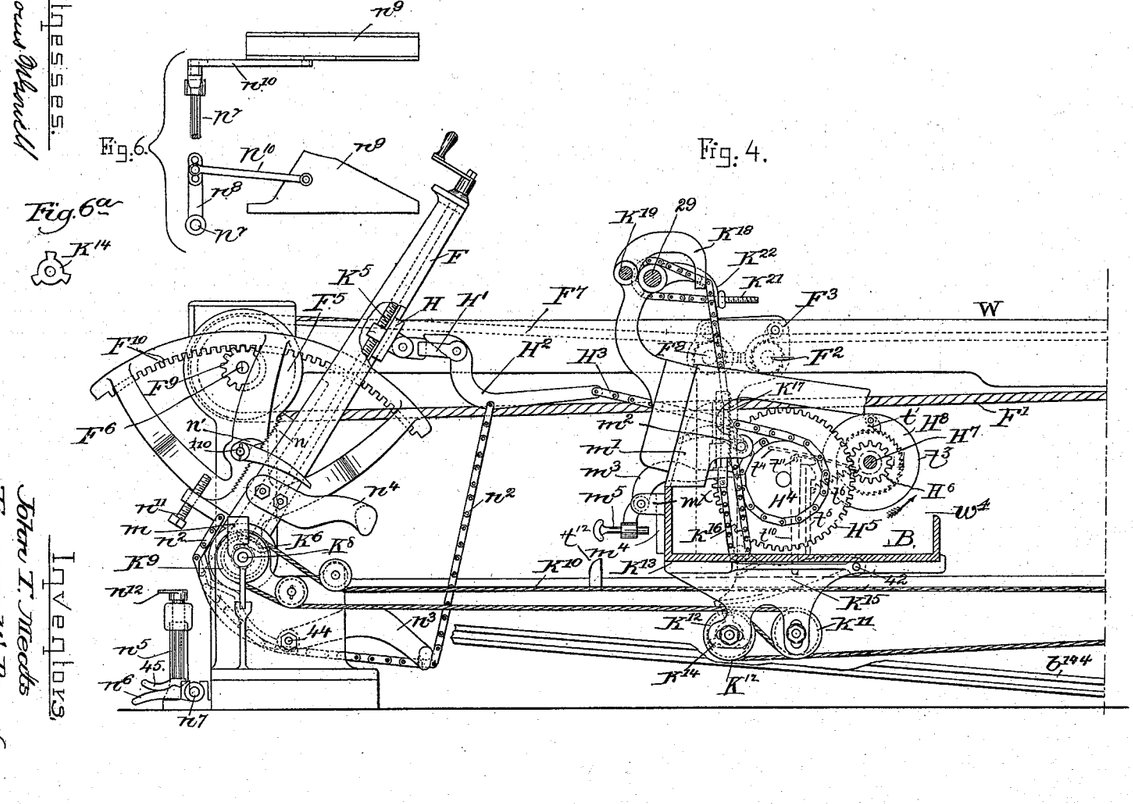
Figure 5:
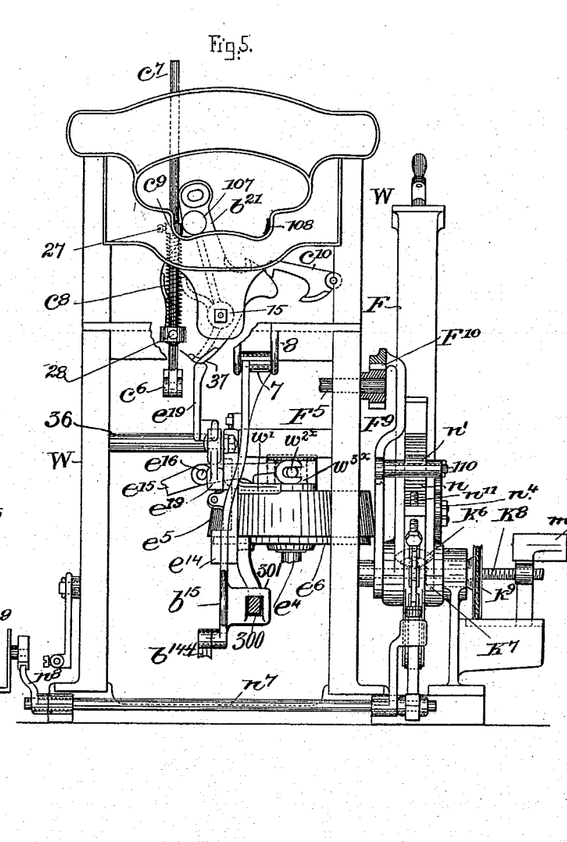
Fig. 5, a partial front elevation of the head-stock, the scroll-drum and its shaft being omitted.
Figures 8, 9, 10, 11, 12, 12A:
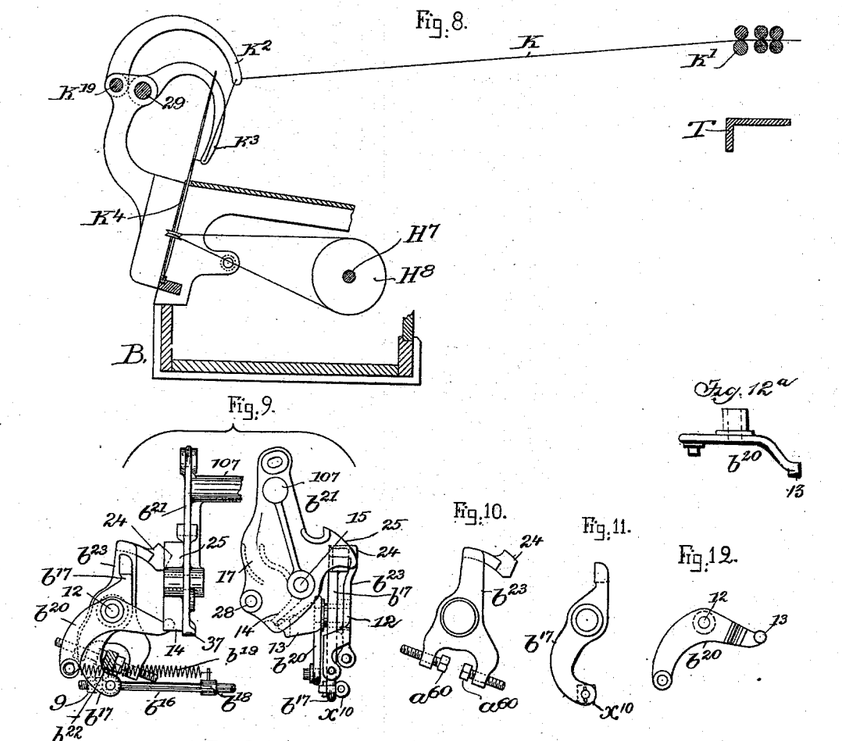

As the carriage completes its outward run the shaft $b^{11}$ is turned far enough by the chain $b^9$ to bring the arm $b^{12}$, fast on it, against the projection $b^{13\times}$ of the loose lever $b^{13}$, before described, and cause said lever to be moved about the shaft $b^{11}$ far enough to move the rod $b^{144}$ to the left, viewing Figs. $4^a$ and 4, causing it to push before it the lever $b^{15}$, (see Figs. 5 and $2^a$,) thus drawing the rod $b^{16}$ to the right, Figs. 8, $2^a$, and 9, causing the spring $b^{19}$ to be strained, the straining of the spring being continued until the set-nuts 9 meet the swivel at the lower end of the lever $b^{17}$, to thus move it and cause said lever to act against the carriage clutch-lever $b^{22}$ (shown in plan, Fig. 18) and move said clutch-lever far enough to disengage the clutch $a^{18}$ and stop the said carriage, it having arrived at the outer end of its stretch, and at the same time said lever $b^{22}$, owing to its contact with the locking and adjusting lever $b^{23}$, moves the latter lever far enough to remove its end 24 from the projection 25 of the change-lever, thus unlocking said change-lever and leaving it free to be oscillated by the lever $b^{20}$, whose end is pressed against the inclined flange 14 of said oscillating change-lever $b^{21}$ by the said spring $b^{19}$ to move the upper end of said change-lever to the right, viewing Fig. 5. The movement of the rod $b^{16}$ to the right, as described, moves the clutch-lever $b^{17}$, and its upper end (see Fig. 13) meets the adjusting device or screw in the upper end of the horizontally-placed drawing-roller clutch-lever $b^{14}$ and moves it, as before described, to release the clutch from the clutch-gear and stop the rotation of the drawing-rolls.

Figures 4, 7:
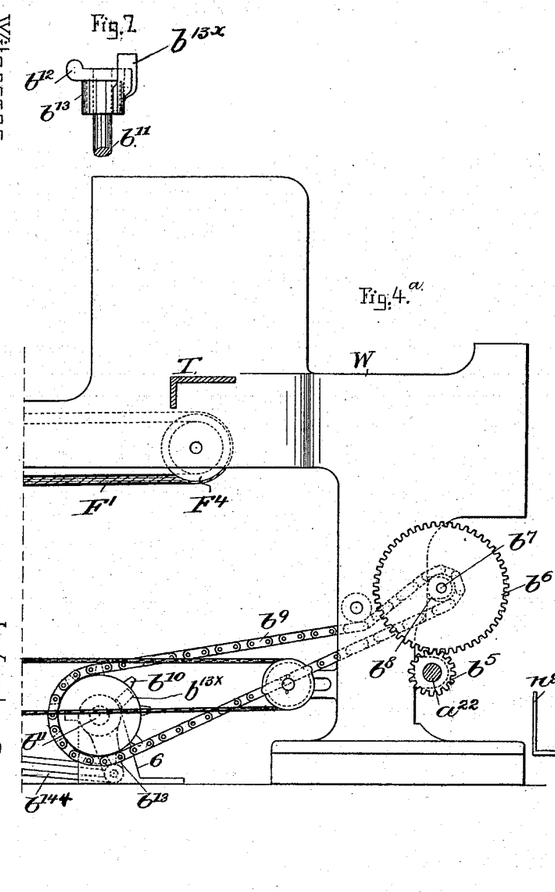
Figs. 4 and 4ª show a right-hand side elevation of the head-stock with the carriage in section.
Fig. 7, a detail of the change-motion mechanism made operative at the outward run of the carriage.

From the foregoing it will be understood that the lever $b^{13}$, (see Figs. $4^a$ and 7,) hung loosely on lever $b^{12}$ and connected to the carriage and drawing-roll clutches $a^{18}$ and $a^{10}$ through the rods $b^{144}$ $b^{16}$ and levers $b^{15}$ $b^{17}$, draws the said clutches out of engagement and stops the motion of the carriages and drawing-rolls at the end of the outward stretch of the carriage, and that the said clutches are held out of engagement through the action of the change-lever $b^{21}$ until the "backing-off" and "winding-on" and "taking-in" motions are completed, said clutches thereafter again coming into engagement, but not until the oscillating change-lever $b^{21}$ has made its change at the beam or at the end of the inward run of the carriage preparatory to repeating the operation of drawing out and spinning.

The belt-shipper $c^4$, mounted to turn on a pivot 101, has a flattened hub 100, and projecting upwardly from said hub it has an arm 102, and the upper end of the belt-shipper has extending rearwardly from it two projections $t^{20}$.

The belt-controller $c$ has a forked or rocker-shaped foot which rests loosely on the flattened hub 100 of the belt-shipper $c^4$, and it is kept seated on said hub by means of a spring 103, connected to the said controller and to the arm 102.

Figure 14:
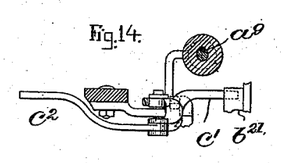
Fig. 14 is a detail in section on the dotted line $y$ $y$, Fig. 13.

The change-lever $b^{21}$ has a cam-shaped groove 17, (shown in Fig. 13 by full lines and by dotted lines in Fig. 9,) said groove receiving one end of a bell-crank lever $c'$, (see Fig. 14,) provided with a jointed link $c^2$, adjustably connected by a bolt 18 (see Fig. 2) with an arm $c^3$, forked at its outer end and provided at its under side between its ends with two lugs 104, said lugs embracing the projections $t^{20}$ of the shipper-lever.

When the carriage is moving inwardly and winding the yarn on the spindles, the belt-controller $c$ holds the belt on the loose pulley A, the spindles being then rotated by the taking in of the carriage, but just before the carriage arrives at the roller-beam, when the winding-on motion of the spindles is to be stopped, the belt-controller is, through the rod $c^{12}$, common to mules, pushed to the left far enough to put the belt onto the fast pulley to start the spindles, so that as the guiding-faller rises the yarn will go to the tops of the spindles without snarls, and immediately thereafter the said change-lever is moved and the carriage is started out with the spindles at speed. As the change-lever is moved at the completion of the inward run of the carriage toward the roller-beam, it, through the arm $c^3$, moves the belt-shipper and causes its flattened hub, embraced by the rocker-shaped foot, to act on the belt-controller to maintain it in position to keep the belt on the fast pulley while the carriage runs out for spinning.

Figure 3:
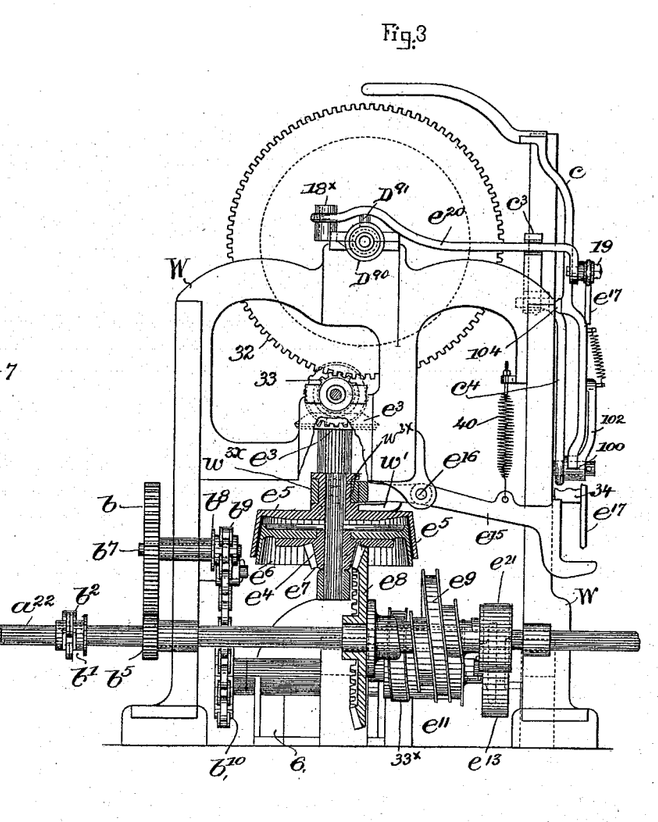
Fig. 3 is a rear elevation of the head-stock with the drawing-in friction in section.

The back-off friction D, before referred to, has (see Fig. 1) an annularly-grooved hub $D^{90}$, in which enters a roller or other stud $D^{91}$, (see Fig. 3,) carried by a lever $e^{20}$, pivoted at $18^\times$, said lever at its outer end having a vertical slot which receives a pin 19, made adjustable in a slot at the upper end of a lever $e^{17}$, pivoted at 20, the lower end of said lever having jointed to it a rod 21, to be hereinafter described. The lever $e^{20}$ is extended through a slot in the end of the arm $c^3$, and said lever acts against said arm as the carriage completes its outward run, as shown in Fig. 2, and holds the back-off friction from contact with the fast pulley $A^\times$ until it is time for the backing off to commence, but the arm $c^3$ is not then moved, for it is held by the change-lever.

During the latter part of the outward run of the carriage the belt-controller is gradually removed from the fast to the loose pulley by or through the rod $c^{12}$, before referred to and common to mules, for a distance sufficient to reduce the speed or momentum of the spindles preparatory to backing off, and after the carriage completes its outward stretch and the change-lever $b^{21}$ is moved to the right and the belt-shipper $c^4$, moved by it through the arm $c^3$, again effects a change of position of the flattened hub 100, which acts on the belt-controller to keep it in position to maintain the belt on the loose pulley during backing off and the running in of the carriage to the beam. As the arm $c^3$ is moved to the right by the change-lever it permits the lever $e^{20}$ to follow it and put the back-off friction D into clutch with the fast pulley mounted on the shaft $A'$, having the grooved pulley $D'$, which, through suitable band, rotates the spindles for spinning.

The back-off friction, mounted loosely on the shaft $A'$, is always rotated, but in a direction opposite that in which the fast pulley turns during spinning, and when the back-off friction is permitted to engage the said fast pulley the back-off friction thereafter acts to turn the shaft $A'$ to unwind the yarn from the point of the spindle preparatory to winding on.

The lever $e^{20}$ is moved to put the back-off friction into gear by the following devices, viz: a lever $e^{17}$, pivoted at 20 and connected by stud 19 in lever $e^{20}$, entering a slot in lever $e^{17}$, the lever $e^{17}$ having connected to it a rod 21, (see Fig. 2,) extended (see Fig. $2^a$) to the outer end of the frame, where said rod is guided in a swivel-stud 105 and surrounded by a spring $21^\times$, acted upon by a lever 106, having a slot 107, in which will be secured a roller or other stud adapted to be struck by a lever pivoted on the carriage and suitably connected in usual manner with the guiding-faller, the said lever meeting the said roller or other stud when the carriage is going out, thus turning the lever 106, causing it to compress the spring $21^\times$ and store up sufficient power to move the levers $e^{17}$ and $e^{20}$ to put the back-off friction in gear, the shipper and auxiliary levers $c$ and $c^4$ having been previously moved, as stated. After the backing off has been completed the back-off clutch will be thrown out of gear, as will be hereinafter described, and the carriage will be run in and the spindles be rotated in the direction to wind the yarn thereon, and this done the carriage-clutch $a^{18}$ and roller-clutch $a^{10}$ are again engaged and the carriage is again started outwardly.

The change-lever $b^{21}$ having been moved by the lever $b^{20}$, as hereinbefore described, said change-lever in its new position, it being the reverse of that shown in Fig. 5, causes the belt-shifter to move the belt onto the loose pulley A and keep the carriage and drawing-roll clutches $a^8$ and $a^{10}$ out of engagement, leaving the mule free to back off and wind on as it runs in toward the beam.

The locking and adjusting lever $b^{23}$ holds the carriage-clutch $a^{18}$ out of engagement during the backing-off and winding-on operations, and at the same time the drawing-roll clutch $a^{10}$ is held out of operation and the rolls are left at rest, and this same lever $b^{23}$ by its lug 24 engaging a projection 25 of the oscillating lever $b^{21}$ locks the latter in place while the carriage is running out and spinning.

The oscillating change-lever $b^{21}$ is reversed at the end of the inward run of the carriage by means of a lever $c^6$, (see Figs. 2 and 5,) hung on a stud 26, said lever at its opposite end being pin-jointed to a vertical rod $c^7$, (see Fig. 5,) normally elevated by a spiral or other spring $c^8$, seated on a swivel-collar 28, swiveled in the lever $b^{21}$, the upper end of said spring acting against the collar $c^9$, made adjustable on the rod $c^7$ by a suitable set-screw 27.

The lever $b^{21}$ is held in the position for winding, or in what is sometimes called its "taking-in" position, by a hook $c^{10}$, (see Fig. 5,) said hook being lifted to disengage said lever as the carriage arrives at the end of its inward run by an inclined plate $c^{11}$, mounted on the carriage.

The lever $b^{21}$ at its rear side has a stop-lug 107, which contacts at the extremes of its throw with a suitable buffer attached to the head-stock, one of said buffers being shown at 108, Fig. 5.

As the carriage approaches the usual roller-beam T (see Fig. 8) in its inward run the usual faller-rod 29 acts on and depresses the lever $c^6$, pulls down rod $c^7$, and compresses the spring $c^8$, so that when the said lever $b^{21}$ is released by raising the hook $c^{10}$ the said spring will quickly act to throw the said lever into the position shown in Fig. 5, which is the position it occupies during the outward run of the carriage, such movement of the lever $b^{21}$ effecting the engagement of the clutches $a^{18}$ and $a^{10}$ and the shifting of the driving-belt onto the fast pulley.

When it is desired to rotate the spindles backwardly for what is called "backing-off," the faller-wire $K^3$ being at the same time depressed to be ready for the winding-on, the backing-off friction device D is moved laterally by the lever $e^{20}$, so as to engage the friction side of the fast pulley $A^\times$ on shaft $A'$ in order that the said friction-pulley D for the instant by its engagement with the said pulley $A^\times$ will rotate the main shaft in a reverse direction and with it the twist-pulley $D'$ for a sufficient length of time to effect a reverse rotation of the spindles and the consequent backing off of the yarn. The twist-pulley $D'$ receives upon it the cylinder-driving band, (not shown,) said band in practice passing over said pulley in one groove thereof and then over suitable carrier-pulleys about the cylinder-pulley and back again over the twist-pulley in the other groove thereof, all as usual in mules, so said band need not be herein further illustrated.

Figure 15:
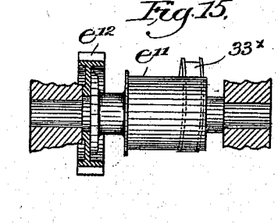
Fig. 15 is a detail showing the drawing-in drum and some of its coöperating parts.
Figure 21:
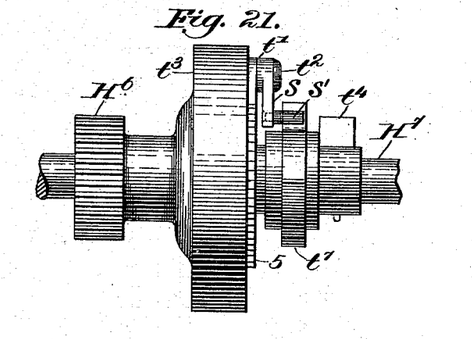
Fig. 21 shows part of the shaft H$^7$ and devices carried by it.

The power for running in the carriage is applied to the pulley E, the shaft on which it is secured having a bevel-gear $e^2$, which engages a bevel-gear $e^3$ on a vertical shaft $e^4$, having splined on it the concaved half $e^5$ of the so-called "winding-on" and "drawing-in" friction-clutch device, the other half, $e^6$, being loose on the said shaft $e^4$ and being provided with a bevel-gear $e^7$, which engages a bevel-gear $e^8$, loose on the back shaft $a^{22}$, but fast on one end of the hub of the scroll-pulley $e^9$. This scroll-pulley receives about it a flexible metallic connection $e^{10}$, shown as a chain, one end of the said chain being made fast to the said scroll, while its other end is made fast to a taking-in drum $e^{11}$, said drum having a gear $e^{12}$, which, in engagement with the intermediate gear $e^{13}$, rotates the back shaft during the running in of the carriage. The drum $e^{11}$, the shape of which is best shown in detail, Fig. 15, has near one end a cam-like or eccentric projection $33^\times$, which during the latter part of the running in of the carriage receives upon it the chain $e^{10}$, thus diminishing the speed of the carriage as it approaches the roller-beam more than is possible by means of the scroll-pulley alone.

The part $e^5$ of the friction device is put out of engagement with the part $e^6$ while the carriage is running out by means of a lever $e^{14}$, which rests against the under side of the lever $e^{15}$, pivoted at $e^{16}$, (see Fig. 5,) it having (see Figs. 2, 3, and 5) a projecting arm $w'$, forked at one end and embracing pins $w^{2\times}$, extended from the opposite sides of a loose collar $w^{3\times}$, loosely connected with the hub of the clutch part $e^5$, the lever $e^{15}$, after it has been moved to separate the said clutch parts, said lever $e^{15}$ being held in such position by a lug 34, extended from the so-called "upright back-off" lever $e^{17}$ (see Fig. 3) and acting on said lever. (See Fig. 3.)

The lever $e^{14}$ has its pivot at 36, and it has a hub which enters a hole in the opening-lever $e^{19}$ of the taking-in friction, said lever $e^{14}$ (see Fig. 2) also having an arm provided with a set-bolt 35, which enters a slot $x^{12}$ (see Fig. 2) in the lever $e^{14}$, said bolt serving to hold the said lever $e^{14}$ in the position it may have been put by the adjusting-screw $e^{18}$, carried by the lever $e^{14}$ and abutting against the said opening-lever $e^{19}$. The right-hand end (see Figs. 2 and 5) of the opening-lever $e^{19}$ rests against the part 37 of the oscillating change-lever $b^{21}$, (see Fig. 5,) while the carriage is running out and until the position of said lever is changed at the end of the stretch preparatory to running the carriage in, when the said oscillating change-lever $b^{21}$ is moved, as stated, to its taking-in side, leaving the lever $e^{19}$ free to move and let the friction part $e^5$ drop into engagement with the part $e^6$, but this engagement is not effected until the backing off is completed, for during the backing off the lug 34 on the lever $e^{17}$ bears on the end of lever $e^{15}$, but as soon as the backing-off operation is completed the lever $e^{17}$ in its movement, as before described, opens the backing-off friction and removes the lug 34 from the lever $e^{15}$, letting a spring 40 act to quickly engage the taking-in friction.

The quadrant F to regulate the winding on, as in other mules, is driven by a rope $F'$, adjustably secured at one end to the carriage B by an adjustable fastening $F^2$ on a stand $F^3$, said rope passing over a carrier-pulley $F^4$ at the rear of the head-stock and then back toward the quadrant, where it is secured to the scroll-drum $F^5$, fast on a shaft $F^6$. Another rope $F^7$ is made fast to the carriage by a like fastening $F^8$ and is wound around the said scroll-drum $F^5$ in the opposite direction and secured thereto.

The shaft $F^6$ has secured to its end a gear $F^9$, which engages the teeth of the segmental part $F^{10}$, suitably bolted or attached to the quadrant-frame F, so that as the carriage is moved to and from the roller-beam T motion is conveyed to the quadrant by the described ropes and gears.

The usual sliding nut H of the quadrant-frame F is connected loosely with the winding-chain $H^3$ by the winding-chain fastenings $H'$ and $H^2$, said chain being secured at one end to the chain-drum $H^4$ of the carriage B, said drum having a gear $H^5$, which engages and rotates a gear $H^6$, fast on the cylinder-shaft $H^7$, provided with the usual tin cylinders $H^8$, the motion of which through cotton bands (see Fig. 8) drives the spindles $K^4$ in usual manner.

The motion of the spindles $K^4$ for winding on is obtained while the carriage B is moving away from the sliding nut H of the quadrant at a speed greater than the speed of the nut itself, the gain of the carriage over the chain or sliding nut revolving the winding-drum $H^4$ and through the gears $H^5$ and $H^6$ turning the usual cylinders $H^8$, thus giving motion to the spindles in the usual way. In the first wind which is made on the bare spindle the quadrant sliding nut H will start at a point near the bottom of the quadrant-frame F, and the speed of the spindles will be increased very slightly as the carriage B is moved to the beam T. At the next wind the speed of the spindle should be diminished at the beginning of the wind in proportion as the yarn wound on in the previous wind increased the diameter on which the winding is now to be effected. It will therefore be understood that the quadrant sliding nut H must be raised enough to give the proper spindle speed to wind on after each successive draw, the spindle speed being diminished in suitable proportions at the beginning of each winding on until the cone has been formed, after which the winding-on motion is approximately uniform until the full cop is formed. As the yarn K is being wound on it passes from the drawing-rolls $K'$ over the tension-wire of the counter-faller $K^2$ and under the guide or faller wire $K^3$ to the spindle $K^4$, and when the spindle speed is too great for the amount of yarn to be taken up the sliding nut H is raised by means of the quadrant-screw $K^5$, at the lower end of which is the usual bevel-gear $K^6$, (see dotted lines, Fig. 5,) which engages a bevel-gear $K^7$ on a short shaft $K^8$, passing through the journal of the quadrant-frame, the said shaft having secured to it a grooved wheel $K^9$, connected by means of a band $K^{10}$, of preferably round leather, with two grooved wheels $K^{11}$ $K^{12}$, mounted loosely on studs made fast to a stand $K^{13}$, suitably bolted to the carriage B. Secured to grooved wheel $K^{12}$ is a stop-wheel $K^{14}$, (shown separately in Fig. 6$^a$ and by dotted lines, Fig. 4,) above which is hung a stop-lever $K^{15}$, pivoted on a stud 42 of the carriage.

The carriage has bolted to it a stand $m'$, (see Figs. 1$^a$ and 4,) which receives a rack $K^{17}$, which is free to slide in said stand when not held in place by the pawl $m^2$. This rack has connected to it at its lower end a small chain $K^{16}$, which is passed through an opening in a lever $K^{15}$, and thence through an opening in a finger $K^{18}$, secured to the counter or tension faller-rod $K^{19}$, said chain passing around the faller-rod 29 and being secured to an adjusting-screw $K^{21}$ on a finger $K^{22}$, which is secured to the said faller-rod.

If the spindle speed becomes too great while winding on, the strain of the yarn will draw the counter or tension faller-wire $K^2$ down, thus dropping the stop-lever $K^{15}$ into engagement with stop-wheel $K^{14}$, and, holding said wheel fast, will cause the carriage in its motion to turn the feed or grooved wheel $K^9$ and through bevel-gears $K^6$ $K^7$ and screw $K^5$ move the sliding nut H upon the quadrant-screw until the spindle speed is diminished sufficiently to allow the counter or tension faller $K^2$ to resume its proper level, when the said stop-lever will be raised from engagement with the said stop-wheel $K^{14}$. This done the quadrant-screw will stop its rotation until the spindle speed again becomes too great for the cone of yarn which is being wound from draw to draw.

The device for diminishing the quadrant feed as the cone is being formed consists of a nut $m$, having (see Figs. 1 and 5) a cam-shaped wing, said nut being mounted on the threaded shaft $K^8$ and being adjusted thereon to complete its stroke toward the wheel $K^9$ simultaneously with the completion of the conical base of the cop.

The vertical rack $K^{17}$ has loosely connected to it a lever $m^3$, pivoted on stand $m^\times$, bolted to the front of the carriage B, and on said lever is an adjusting device $m^5$, the said rack being raised in its guide by the contact of said adjusting device with the wing of the nut $m$ as the carriage is moved out, said nut being moved on said shaft intermittingly from draw to draw. The feed of the nut $m$ is diminished as the vertical rack $K^{17}$ is raised and as the cone is formed, and the cone having been formed the motion of the nuts $m$ and H ceases. After the formation of the cone referred to the builder-motion assumes control of the faller and counter-faller and actuates them in usual manner, except as hereinafter described when referring to our improved nosing-motions.

The pointing or winding firmly of the nose of the cop is accomplished by means of a rack $n$, free to slide in a groove in the quadrant-frame F, it having coöperating with it a pawl $n'$, said rack having attached to it a nosing-chain $n^2$, which is passed under the quadrant-frame F, and a lever $n^3$, pivoted at 44, said chain being made fast to the winding-chain fastening $H^2$. As the carriage B is moved toward the beam T and the quadrant is turned down in a forward direction the arm $n^4$, carried by the quadrant, strikes the lever $n^3$ and presses it onto the nosing-chain, and thus causes it to impart an extra amount of motion to the winding-on chain $H^3$, and thus increase at the inward run of the carriage toward the beam the speed of the spindles, to thus wind the yarn more tightly onto the bare part of the spindle or for finishing the nosing of the cop.

The device for moving the nosing-rack $n$ up to shorten the nosing-chain $n^2$ as the cop is being built, as is required in all mules owing to the decreasing diameter of the spindle toward its top, consists of a vertical shaft $n^5$, having a step 45, (see Fig. 4,) resting on a cam-shaped lever $n^6$, secured to a nosing-shaft $n^7$, having at its other end a lever $n^8$, (see Figs. 5 and 6,) connected through the rod $n^{10}$ with the cop-building former $n^9$, of usual shape. When the conical base of the cop has been built, the building-former $n^9$ comes into position to move the lever $n^8$ and thus gradually raise the shaft $n^5$. As the quadrant is moved out at the end of the stretch the adjusting-screw $n^{11}$, connected to the nosing-rack $n$, strikes the cap $n^{12}$ of the vertical shaft $n^5$ and raises the nosing-rack $n$ a little, and it is held in its lifted position by a pawl $n'$. During the operation of building the cop the building-former $n^9$ is moved progressively toward the roller-beam.

To start the drawing-rolls at the proper time in relation to the motion of carriage B from the roller-beam T, the drawing-roll clutch $a^{10}$ has a wide space made in it, as shown in Fig. 16. The shaft $a^9$ of the front drawing-rolls has a spiral spring $r^3$, one end of which is connected to a collar $r^4$, fast on the shaft $a^9$, by a set-screw 47, the other end of the spring being inserted in the clutch $a^{10}$, the latter having a splineway 48, (see Fig. 17,) wider than the spline 49, by means of which the clutch is enabled to rotate the said shaft, said spring normally acting to keep the clutch $a^{10}$ and clutch-gear $a^8$ in engagement. The hub of the clutch is surrounded by a ring $r$, adjustably attached thereto by a set-screw $r^2$, said ring having a pin $r'$, which is extended into the splineway 47 far enough to engage one side of the spline. This ring may be adjusted on the clutch so that the working or right-hand side 50 of the splineway (see Fig. 17) may be set at any desired point with relation to the spline when the clutch is not engaged, thus permitting the clutch to rotate more or less, as may be desired, before imparting motion to the front-roller shaft $a^9$. Thus by means of the ring-clamp $r$, with pin $r'$ to stop the clutch $a^{10}$ and adjusted with set-screw $r^2$ in ring $r$, the drawing-rolls K' can be arranged to start with or a little later than carriage B, which arrangement renders it possible to take out snarls before the drawing-rolls begin to deliver yarn.

The locking and adjusting lever $b^{23}$ has its lower end forked (see Fig. 10) and provided with adjusting-screws $a^{60}$, the heads of which act on the lever $b^{22}$, and by adjusting these screws just the desired extent of motion may be imparted to the clutch $a^{18}$ at just the desired time with relation to the motion of the carriage.

Figures 22, 24:
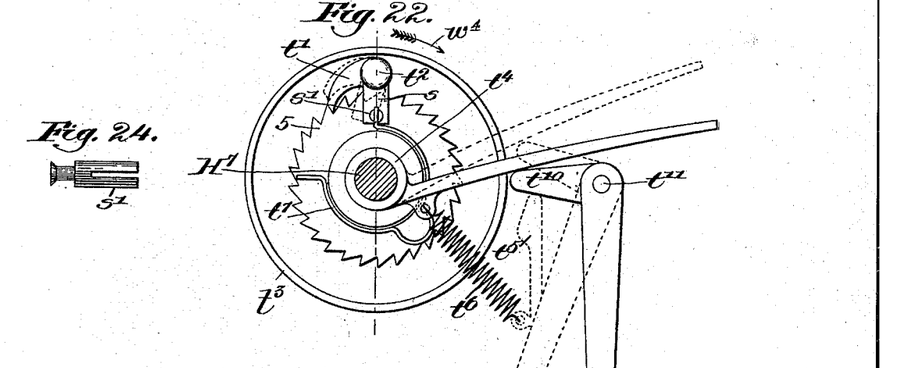
Fig. 22 is a right-hand side elevation of the ratchet and flanged plate and coöperating parts of Fig. 21.
Fig. 24 shows separately the forked or crotched stud, between the ends of which is inserted the clamp-spring $f^7$.
Figure 23:
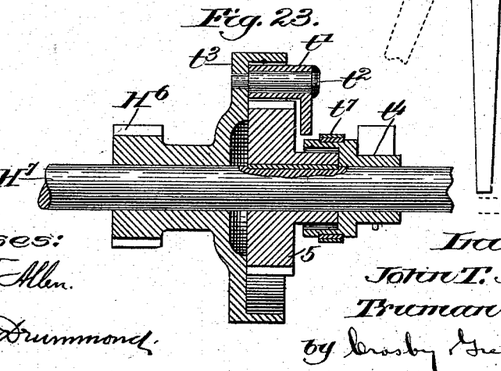
Fig. 23 is a longitudinal section of the parts shown in Fig. 21.

Referring to Figs. 19 and 20, we have shown a modification wherein the shaft $a^{16}$ is provided with a sprocket-wheel 200, which drives a chain 201, extended about a sprocket-wheel 202 on the back shaft $a^{22}$, and we have shown the back shaft as having a secured sprocket-wheel 203, which by a secured sprocket-chain 204 on a sprocket-wheel 205, supposed to be fast on the shaft of the drum $e^{11}$, rotates the said drum. These two chains and sprocket-wheels are mechanical equivalents for the gearing previously described as operative between the shaft $a^{16}$, back shaft, and drum-shaft, and this invention is not limited to the exact construction shown of the devices for positively connecting the three shafts—viz., the shaft $a^{16}$, back shaft, and drum-shaft. The cylinder-shaft $H^7$ has fast on it a ratchet-wheel 5. Alongside of this ratchet-wheel and loose on said shaft is a gear $H^6$, having a flanged plate $t^3$, provided with a stud $t^2$, on which is pivoted a pawl $t'$. This pawl has a wing $s$, having mounted loosely on it a forked stud $s'$, which is engaged by one end of an engaging device $t^7$, shown as a spring-like clasp faced with leather and partially surrounding a clasp-holder $t^4$, free to turn on the said cylinder-shaft inside said clasp, the said clasp-holder having an extended arm, which rests on a lever $t^{10}$, pivoted at $t^{11}$ on the carriage, the short arm of the said lever normally resting on a rest $t^5$, also connected to the carriage. A spring $t^6$, connected to the arm of said holder $t^4$, keeps it against the rest $t^5$. While the carriage is running out the arm of the holder $t^4$ lies on the short arm of the lever $t^{10}$, supported by a suitable rest $t^5$; but the pawl $t'$ is not at such time in engagement with the ratchet-wheel 5, because said pawl during such operation is held up, due to the fact that the plate $t^3$, carrying the said pawl, is traveling backwardly with relation to the teeth of the ratchet-wheel in the direction of the arrow, Fig. 22, and at such time the plate $t^3$, carrying the pawl $t'$, causes said pawl to drag the engaging device about the hub of the holder $t^4$, and consequently the point of the pawl $t'$ is lifted from contact with the ratchet-wheel 5, and the said pawl is held from the said ratchet until completion of the backing off. The gear $H^6$ and plate $t^3$, carrying the said pawl during the running out of the carriage and spinning, are moved in the direction of the arrow $w^3$ in Figs. 4 and 22, but the ratchet-wheel 5, fast on the cylinder-shaft, is moving in the opposite direction at a faster speed, the faster speed preventing the pawl from catching into a tooth of the ratchet; but the movement of said ratchet is reversed while the backing off is taking place, but without engaging the pawl. The pawl $t'$ is to engage said ratchet immediately after backing off, so as to be in position before the carriage starts to wind on, and during winding on the said ratchet is moved at a slower speed, due to the movement of the quadrant. To do this, the lever $e^{14}$ near its lower end has connected to it the bent end of a rod 300, (see Fig. 2,) extended back to and through a projecting eye 301 at one side of the lever $b^{15}$, said eye merely acting as a support to sustain the free end of said rod in its slight movement, and said rod has upon it a projection $t^{12}$, (see Fig. 4,) the projection being so adjusted on said rod that just before the carriage completes its outward run the lower end of the said lever $t^{10}$, extended below the carriage, meets said projection $t^{12}$, thus moving said lever $t^{10}$ and causing it to lift the arm of the holder $t^4$, causing its hub to turn in the clasp, the direction of movement of the holder tending to yet keep the pawl out of engagement with the ratchet; but such movement of the holder in the clasp so places the holder that any sudden downward movement of its arm will act to quickly move with it the clasp in a direction to quickly throw the pawl $t'$ into engagement with the ratchet-wheel. After the backing off has been accomplished the winding on must commence, and to effect this the taking-in friction parts $e^5$ $e^6$, before out of contact, must be put in contact. As the friction part $e^5$ drops after backing off, as has been described, to commence the drawing in of the carriage and the winding of the yarn on the spindle the lever $e^{14}$ is turned, as before stated, causing the rod 300, connected to it, to be moved with it far enough to cause the projection $t^{12}$ to leave the lever $t^{10}$, letting the spring $t^6$, connected to the holder, act, it turning the clasp $t^7$ in the direction to cause it to quickly turn the pawl $t'$ down, so as to engage the ratchet-wheel 5, and as soon as the pawl engages said ratchet-wheel, the plate $t^3$ and the friction part having also been engaged, the motion of the ratchet-wheel is reversed by the pawl as the inward motion of the carriage is begun, and the cylinder is turned to wind on the yarn. At the completion of the winding on the shaft $H^7$ is given a faster speed, as common to mules, and the teeth return from effective engagement with said pawl, and the usual changes which take place at the inward run of the carriage are effected. The plate $t^3$ is moved in a direction opposite the arrow when the carriage is moving out or spinning and while winding on at the inward run.

We claim—

1. In a spinning-mule, a back shaft, gearing to rotate it positively to effect the running out of the carriage, connections between said back shaft and carriage, a scroll-pulley loose on said back shaft, a gear attached to said scroll-pulley and adapted to be rotated by the drawing-in friction, a drum, and a shaft carrying it, combined with a flexible connection attached to said scroll-pulley and to said drum, and with gearing between the drum-shaft and the back shaft, said devices enabling the carriage to be moved with an accelerating and diminishing speed through the said back shaft during the winding on at the inward run of the carriage, substantially as described.

2. In a spinning-mule, a back shaft, gearing to rotate it, a carriage, a series of flexible connections between said back shaft and said carriage for imparting motion from the back shaft to the carriage, and yielding devices joining said connections to said carriage whereby the strain exerted to move the carriage is applied in a yielding manner, to operate, substantially as described.

3. In a spinning-mule, a carriage, flexible connections, and a rod and spring to join said carriage and connections to afford elasticity and ease the shock of starting and stopping the carriage, substantially as described.

4. In a spinning-mule the following instrumentalities, viz: a back shaft, means to rotate it positively, a scroll-pulley loose on said back shaft, a shaft parallel to said back shaft, a drawing-in drum mounted thereon, a carriage, flexible connections between the said back shaft and said carriage, gears between said drawing-in-drum shaft and back shaft, combined with a flexible connection between said scroll-pulley and drawing-in drum, whereby the said drawing-in drum is always moved positively or without slip from the scroll-pulley, substantially as described.

5. In a spinning-mule, a back shaft, a scroll-pulley thereon, a drum, a chain or band connecting said scroll-pulley and drum, and gears connecting said drum and back shaft, combined with a chain-gear on the back shaft, and chains driven by said gears and attached to the carriage, to operate, substantially as described.

6. The faller and counter-faller shafts; their attached fingers and chain connecting them, combined with the carriage, a stand thereon and a rack also connected to said chain, said rack being movable on said stand, and a device to move the said rack vertically immediately before winding on, substantially as described.

7. The faller and counter-faller shafts; their attached fingers and chain connecting them, and a rack connected to said chain, a quadrant-screw, a lever as $m^3$, a screw $K^8$, and gears between said screws, combined with a cam-shaped wing controlled as to its position with relation to said lever by the said quadrant-screw, to operate, substantially as described.

8. The faller and counter-faller shafts; their attached fingers and chain connecting them, combined with a rack also connected to said chain, a stand to guide said rack, and a device to move said rack independently of said chain, a stop-lever as $K^{15}$, and a stop-wheel to operate, substantially as described.

9. The carriage, its pulleys $K^{11}$, $K^{12}$, stop-wheel, and stop-lever, combined with the band $K^{10}$, the quadrant-screw and devices intermediate said band and quadrant-screw, the locking of the stop-wheel and the stopping of the band effecting the rotation of the quadrant-screw for the purposes set forth.

10. The chain connecting the faller and counter-faller fingers, the rack, and its lifting-lever, the movable cam $m$, and stop-lever, stop-wheel and band $K^{10}$, combined with the adjusting device $m^5$, to operate substantially as described, and determine the time at which the stop-lever shall operate during the operation of winding on.

11. The back shaft; its gear $b^5$; the gear $b^6$; the sprocket-gears $b^8$ and $b^{10}$; and the connected sprocket-chain, and the shaft $b^{11}$, levers $b^{12}$, $b^{13}$, combined with the oscillating change-lever and intermediate connecting devices, to operate, substantially as described.

12. The front-roll shaft, and the roll-clutch $a^{10}$ loose thereon and having a slotted hub, combined with an adjustable stop carried by said clutch, whereby the said clutch may be started more or less in advance of the movement of the shaft preparatory to the running out of the carriage, substantially as described.

13. In a mule, the back shaft provided with sprocket-wheels, and a gear $a^{21}$, the carriage, the clutch-gear $a^{17}$, and gears between it and the gear $a^{21}$ to rotate the said back shaft, combined with sprocket-chains extended over said sprocket-wheels and connected to said carriage to move the said carriage in during the winding operation, substantially as described.

14. The quadrant, the nosing-rack carried thereby and free to slide thereon, the winding-on chain, the nosing-chain operatively connected to said rack and to the winding-on chain, and a builder-shoe, combined with devices intermediate said shoe and rack to actuate the latter at the end of each outward throw of the quadrant, and means to hold said rack in place, substantially as described.

15. In a mule, a drum-shaft, a taking-in drum thereon; a back shaft; and a scroll-pulley; a winding and taking-in friction; gearing intermediate it and the scroll-pulley gearing, combined with a sprocket-chain to connect the said drum-shaft with the said back shaft, substantially as described.

16. The lever $b^{15}$, the clutch-lever $b^{17}$, the rod $b^{16}$ connecting them, combined with lever $b^{20}$, a spring to connect said lever $b^{20}$ to said rod, and the change-lever acted upon by said lever $b^{20}$, whereby said lever $b^{20}$ is held in a yielding manner in contact with the said change-lever, substantially as described.

17. A mule containing the following instrumentalities, viz: a scroll-pulley, a taking-in drum, and connecting devices, the said taking-in drum having a cam-like or eccentric projection to aid in diminishing the speed of the carriage at the end of the inward run thereof, substantially as described.

18. The quadrant, its shaft, its screw, the screw $K^8$, and gearing between the said screws, combined with a cam as $m$, substantially as described.

19. The quadrant, the nosing-rack carried thereby and free to slide thereon, the winding-on chain, the nosing-chain operatively connected to said rack and to the winding-on chain, and the builder-shoe, combined with devices intermediate said shoe and rack to actuate the latter at the end of each outward throw of the quadrant, substantially as described.

20. The carriage, the cylinder-shaft, having an attached ratchet, a loose gear mounted on said shaft and having an attached plate provided with a pawl, and an arm or holder having a collar or hub and mounted loosely on said shaft, combined with a friction device surrounding said hub or collar and connected to said pawl, whereby movement of said clamp over said hub in one direction will disengage said pawl from said ratchet, while movement of said hub in the opposite direction in said clamp will quickly throw the pawl into engagement with said ratchet for winding on, substantially as described.

21. The cylinder-shaft, its attached ratchet, a gear loose on said shaft and having a plate provided with a pivoted pawl, combined with means to act on said pawl and keep said pawl from said ratchet when said gear is being rotated in one direction, and means to effect the quick engagement of the pawl and ratchet when the yarn is to be wound on the spindles, substantially as described.

22. The driving-shaft $A'$, bevel-gear $a^2$ thereon, shaft $a^4$, bevel-gear $a^3$ and gear $a^5$ thereon; the roller-shaft $a^9$, the train of gears $a^6$, $a^7$, and the gear $a^8$ loose on the roller-shaft, the sliding clutch $a^{10}$ splined on the said shaft and adapted to engage the gear $a^8$, the gear $a^{11}$ driven by the gear $a^8$, the shaft $a^{12}$ having the gear $a^{13}$ fixed to it and driving the intermediate $a^{14}$, in turn engaging and driving the gear $a^{15}$ mounted on the carriage-clutch shaft $a^{16}$, the clutch-gear $a^{17}$ loose on the said carriage-clutch shaft and engaging the intermediate $a^{19}$, it in turn engaging a second intermediate $a^{20}$ which meshes with the pinion $a^{21}$ on and rotates the back shaft, substantially as described.

23. In a spinning-mule, the back shaft $a^{22}$, the shaft $b^{11}$ having the lever $b^{12}$ mounted thereon and driven from the back shaft through the gears $b^5$, $b^6$, $b^8$, $b^{10}$, and chain $b^9$; the lever $b^{13}$ mounted on the said shaft $b^{11}$, its connected rod $b^{144}$, the swinging lever $b^{15}$ to which the said rod is attached, the rod $b^{16}$ connected to the lever $b^{15}$, and having a nut 9, the change-lever $b^{17}$, to which the said rod is connected loosely, a dog $b^{18}$ fast on the said rod $b^{16}$, the spring $b^{19}$ connected to said dog, the lever $b^{20}$ connected to said spring, the oscillating change-lever $b^{21}$ engaged and actuated in one direction by the said lever $b^{20}$, combined with the carriage-clutch and the lever $b^{23}$ to actuate the same to effect the disengagement of the carriage-clutch at the outer end of the stretch, substantially as described.

24. The oscillating change-lever $b^{21}$, provided with a notch and having a swivel-collar 28, a hook or latch $c^{10}$ to engage said notch; a rod $c^7$ having a collar $c^9$, a spring $c^8$ surrounding said rod and acted upon at one end by said collar $c^9$ and resting at its other end against the said swivel-collar, a lever $c^6$ connected with said rod and jointed at its other end to the framework, combined with the carriage having a projection to act upon said lever $c^6$ during the inward movement of the carriage, and having a second projection to act upon and raise the latch $c^{10}$, thereby releasing the change-lever, substantially as described.

25. The continuously-rotating taking-in pulley E mounted on the shaft E', having a bevel-gear $e^2$, the shaft $e^4$ having the bevel-gear $e^3$ engaged by the bevel-gear $e^2$, the friction-shell $e^5$ splined to said shaft $e^4$, the friction-cup $e^6$ loose on said shaft, the bevel-gear $e^7$ fast on the friction-cup, the back shaft $a^{22}$, the bevel-gear $e^8$ loose on the back shaft, the scroll-pulley $e^9$ connected to said gear $e^8$ and the chain $e^{10}$, connected to said scroll-pulley, a drum $e^{11}$ mounted on a shaft and provided with a gear $e^{12}$, the intermediate gear $e^{13}$ the back shaft, the gear $a^{21}$ thereon, engaged by said intermediate $e^{13}$, combined with the levers $e^{14}$, $e^{15}$, the clutch-lever $e^{17}$, for releasing the said lever $e^{15}$, and devices to move the said clutch-lever $e^{17}$ at the outward run of the carriage to effect the release of the lever $e^{15}$, and the engagement of the taking-in friction, substantially as described.

26. The quadrant, its projecting arm, the nosing-rack mounted to slide thereon, the pawl to engage said rack, the nosing-chain connected to said rack, the winding-on chain to which the nosing-chain is attached, the tin cylinder, gearing between it and the winding-on drum and spindles, combined with a lever adapted to be struck during the inward run of the carriage by the said projecting arm to temporarily impart to the winding-on chain extra motion to increase momentarily the speed of the spindles when winding the nose of the cop, substantially as described.

27. The front-roll shaft $a^9$ having a longitudinal spline, a clutch surrounding said shaft loosely, a clamp-ring adjustably connected to the hub of said clutch, a pin carried by said clutch-ring extended through the hub of the clutch and engaging the said longitudinal spline, and a spring connected with said shaft to keep the said pin in contact with one side of said spline and hold the clutch in a yielding manner, combined with means to rotate the said clutch-gear to effect the rotation of the roller-shaft, the said clutch-gear moving for a short distance when started, about the shaft, without imparting motion thereto to thus enable the rolls to rest temporarily as the carriage is started out from the beam for the purpose set forth.

28. The front-roll shaft having a longitudinal spline, a clutch free to slide thereon and having a slot in its hub wider than said spline, and a ring surrounding said clutch and having a set-screw and a stop-screw, combined with a spring to keep one wall of the slotted part of the hub against one side of said spline, whereby the motion of the front-roll shaft is retarded when the carriage starts out from the beam, substantially as described.

29. The front-roller clutch, and the drawing-roll clutch-lever $b^{14}$, combined with the clutch-lever and an intermediate adjusting device, whereby the exact time for the disengagement of the roller-clutch may be regulated near the completion of the outward run of the carriage, substantially as described.

30. The quadrant, its connected winding-on chain, the nosing-rack, and nosing-chain connected to it, and to said winding-on chain, combined with means between said quadrant and said nosing-chain to temporarily impart to said winding-on chain extra motion, substantially as described.

31. The cylinder-shaft, its attached ratchet-wheel, a gear mounted thereon loosely and carrying a pawl, means to rotate said gear and pawl about said cylinder-shaft, a holder loose on said cylinder-shaft and having an arm, a friction-clasp surrounding the hub of said holder and connected to one end of said pawl, and a spring to move said holder in one direction, combined with means to operate said holder against the stress of its connected spring, whereby when the holder is released to let said spring assume control of the holder, the said pawl will be instantly put into engagement with a tooth of the said ratchet-wheel preparatory to winding on running in the carriage, substantially as described.

32. The nosing-shaft, its connected cop-building former, a cam-shaped lever connected to said nosing-shaft, the quadrant, the nosing-rack carried thereby and having an adjustable screw, and the nosing-chain connected to said rack, combined with devices intermediate said cam-shaped shoe and said screw to automatically elevate the said rack and shorten the effective length of the said chain to thus increase the speed of the spindles when the carriage approaches the beam, substantially as described.

33. The change-lever having a portion 37, and the taking-in friction, combined with intermediate devices acted upon by said change-lever to open the said taking-in friction after moving the change-lever preparatory to running the carriage out, substantially as described.

34. The taking-in friction, its opening-lever, and a lever adjustably attached thereto, combined with a carriage to strike the latter lever at the end of its inward run to insure the opening of the taking-in friction, substantially as described.

35. The oscillating change-lever, the main shipper-lever, combined with an intermediate lever $c'$ actuated by said change-lever to ship the belt, substantially as described.

36. The oscillating change-lever, the locking-lever, and clutch-lever to move the said locking-lever to release the change-lever, combined with means to turn the said change-lever when freed from the locking-lever, substantially as described.

37. The carriage-clutch, its actuating-lever, and change-lever, combined with the locking-lever coöperating with said change-lever and bifurcated to embrace the said actuating-lever, substantially as described.

38. The carriage-clutch, its actuating-lever, and change-lever, combined with the locking-lever coöperating with said change-lever and bifurcated to embrace the said actuating-lever, and an adjusting device carried by said bifurcated end, substantially as described.

39. In a spinning-mule, the following instrumentalities, viz: a carriage-clutch shaft, a carriage-clutch thereon, means to engage and disengage said clutch, a back shaft, means to rotate it positively, a scroll-pulley loose on said back shaft, a shaft parallel to said back shaft, a drawing-in drum mounted thereon, a carriage, flexible connections between the said back shaft and said carriage, gears between said drawing-in-drum shaft and back shaft, combined with a flexible connection between said scroll-pulley and drawing-in drum, whereby the said drawing-in drum is always moved positively or without slip from the scroll-pulley, substantially as described.

40. The quadrant, the sliding nosing-rack carried thereby and provided with an adjusting device, the winding-on chain connected to the quadrant, the nosing-chain operatively connected to said rack and to said winding-on chain, and means to arrest the said rack at the end of the outward throw of the quadrant and slide the same, combined with a pawl to engage the teeth of the rack and hold the same in the position in which it may be left at the outward movement of the quadrant, substantially as described.

41. The quadrant, the nosing-rack carried thereby and free to slide thereon, the winding-on chain connected to the quadrant, the nosing-chain operatively connected to said rack and to said winding-on chain, and means to hold the said rack in the position in which it may be left after being moved, combined with a lever bearing on said nosing-chain, and an arm carried by said quadrant to contact with said lever at each inward run of the carriage, substantially as described.

42. The carriage, its shaft $H^7$, the ratchet 5 fast thereon, the loose gear $H^6$ having the attached plate $t^3$, its pawl, spring $t^7$, and friction collar or arm $t^4$, combined with a lever to actuate said collar or arm in one direction to quickly throw the pawl into said ratchet, substantially as described.

43. The quadrant, the freely-sliding nosing-rack carried thereby, the winding-on chain, the nosing-chain connected to said rack and operatively with the winding-on chain, and the builder-shoe, combined with devices intermediate said shoe and rack to actuate the latter at the end of each outward throw of the quadrant, and a pawl to hold the rack in place, substantially as described.

In testimony whereof we have signed our names to this specification in the presence of two subscribing witnesses.

JOHN T. MEATS.
TRUMAN W. DEAN.

Witnesses:
HORACE A. CROSSMAN,
JOSEPH S. EATON.